(12) United States Patent
Komatsu (10) Patent No.: US 8,972,086 B2
(45) Date of Patent: Mar. 3, 2015

(54) BICYCLE DRIVE APPARATUS

(75) Inventor: Atsushi Komatsu, Osaka (JP)

(73) Assignee: Shimano Inc., Osaka (JP)

( * ) Notice: Subject to any disclaimer, the term of this patent is extended or adjusted under 35 U.S.C. 154(b) by 187 days.

(21) Appl. No.: 13/589,840

(22) Filed: Aug. 20, 2012

(65) Prior Publication Data

US 2013/0054065 A1 Feb. 28, 2013

(30) Foreign Application Priority Data

Aug. 29, 2011 (JP) .................................. 2011-186594

(51) Int. Cl.
*B60L 11/00* (2006.01)
*B62M 6/00* (2010.01)
*B62M 6/45* (2010.01)
*B62K 23/02* (2006.01)

(52) U.S. Cl.
CPC . *B62M 6/45* (2013.01); *B62K 23/02* (2013.01)
USPC ........................................ 701/22; 180/205.1

(58) Field of Classification Search
CPC .... B62M 25/08; B62M 25/045; B62M 9/122; B62M 25/00; B62M 13/00; B62M 3/003; B62M 6/45; B62M 6/50; B62M 6/75; B62J 3/00; B62J 99/00; B62K 19/34
USPC .................. 701/64, 51, 22, 55; 180/221, 220, 180/205.1, 206.1, 206.2; 280/260, 261, 280/281.1; 474/70, 69, 71, 78, 80, 82
See application file for complete search history.

(56) References Cited

U.S. PATENT DOCUMENTS

| 496,638 A | 5/1893 | Clark |
| 5,065,633 A | 11/1991 | Mercat |
| 6,418,797 B1 | 7/2002 | Ambrosina et al. |
| 8,640,805 B2 * | 2/2014 | Kuroki ........................ 180/206.1 |
| 2005/0255950 A1 * | 11/2005 | Takebayashi et al. .......... 474/70 |
| 2005/0275561 A1 | 12/2005 | Kolda et al. |
| 2005/0285461 A1 | 12/2005 | Kitamura et al. |
| 2011/0120232 A1 | 5/2011 | Lassanske |

FOREIGN PATENT DOCUMENTS

| CN | 1020-36875 | * | 4/2011 |
| CN | 102036875 A | | 4/2011 |
| DE | 3150149 A1 | | 6/1983 |
| GB | 2452569 | * | 11/2009 |
| JP | 10-194185 A | | 7/1998 |
| JP | 2000-168672 A | | 6/2000 |
| JP | 2004-155398 A | | 6/2004 |
| JP | 2004-268854 A | | 9/2004 |
| JP | 2007-255953 A | | 10/2007 |

* cited by examiner

*Primary Examiner* — Muhammad Shafi (74) *Attorney, Agent, or Firm* — Global IP Counselors (57) ABSTRACT

A bicycle drive apparatus includes a bicycle crankset, a bicycle transmission, a drive assistance electric motor and a microcomputer. The microcomputer includes an output control section. The output control section has a first control and a second control that makes an output of the drive assistance electric motor smaller than an output of the drive assistance electric motor occurring during the first control only upon determining a crank arm of the bicycle crankset is positioned within a prescribed range of at least one of a top dead center position and a bottom dead center position of the bicycle crankset. The output control section is configured to vary the output of the drive assistance electric motor according to a pedaling force. The output control section switches from the first control to the second control upon receiving a shift command to shift the transmission.

10 Claims, 11 Drawing Sheets

BICYCLE DRIVE APPARATUS

CROSS-REFERENCE TO RELATED APPLICATIONS

This application claims priority under 35 U.S.C. §119 to Japanese Patent Application No. 2011-186594, filed Aug. 29, 2011. The entire disclosure of Japanese Patent Application No. 2011-186594 is hereby incorporated herein by reference.

BACKGROUND

1. Field of the Invention

The present invention relates to a bicycle drive apparatus that controls an electrically assisted bicycle. More specifically, the present invention relates to a bicycle drive apparatus that controls a bicycle having an electric motor for riding assistance and a transmission.

2. Background Information

Recently, electrically assisted bicycles that assist riding by supplementing a person's pedaling force with a motor drive force are becoming popular. Japanese Laid-Open Patent Publication No. 2004-268854 discloses a control enabling the transmission to smoothly conduct a gear shifting operation in an electrically assisted bicycle equipped with a transmission. When a user performs an operation issuing a shift command, the control temporarily stops or decreases an assisting power supplied from a drive assistance motor and resumes the supply of the assisting power after a prescribed amount of time has elapsed. With this control, the transmission can change gears more easily because the gear shifting operation is executed while the supply of the assisting power is stopped or decreased.

SUMMARY

With the control disclosed in Japanese Laid-Open Patent Publication No. 2004-268854, since the supply of the assisting power is limited such that the assisting power is equal to or smaller than a prescribed value during a prescribed period spanning before and after the gear shifting operation, the control incurs the problem that the load born by the rider increases during that period.

The object of the present invention is to enable a smooth gear shifting operation to be accomplished in a bicycle having a drive assistance electric motor and a transmission and to suppress an increase of the load born by the rider during gear shifting.

In accordance with a first aspect, a bicycle drive apparatus is provided that basically comprises a bicycle crankset, a bicycle transmission, a drive assistance electric motor and a microcomputer. The microcomputer includes an output control section. The output control section has a first control and a second control that makes an output of the drive assistance electric motor smaller than an output of the drive assistance electric motor occurring during the first control only upon determining a crank arm of the bicycle crankset is positioned within a prescribed range of at least one of a top dead center position and a bottom dead center position of the bicycle crankset. The output control section is configured to vary the output of the drive assistance electric motor according to a pedaling force. The output control section switches from the first control to the second control upon receiving a shift command to shift the transmission.

With this bicycle drive apparatus, the output control of the drive assistance electric motor is switched from the first control to the second control when a shift command is received with respect to the transmission. During the second control, when the crank is determined to be in a prescribed range including the top and bottom dead centers, the output of the drive assistance electric motor is decreased in comparison with the first control and, thus, a load acting on the transmission and/or a chain tends to be smaller. As a result, the gear shifting operation can be executed smoothly. Meanwhile, during the second control, when the crank is not determined to be inside the prescribed range, the output of the drive assistance electric motor is the same as during the first control and an increase of the load born by the rider is suppressed.

In accordance with a second aspect, the bicycle drive apparatus according to the first aspect is provided such that the transmission includes a gear shifting electric motor. The microcomputer further includes a gear shift control section that operates the gear shifting electric motor based on the shift command. The gear shift control section operates the gear shifting electric motor while the output of the drive assistance electric motor is within a prescribed amount of a minimum value during the second control. With this aspect, since the gear shifting operation is executed at a timing corresponding to when the output of the drive assistance electric motor is near a minimum value, aloud acting on the transmission and/or the chain tends to be smaller and the gear shifting operation is executed smoothly.

In accordance with a third aspect, the bicycle drive apparatus according to the first aspect or second aspect further comprises a pedaling force measuring sensor that measures a pedaling force. The output control section controls the output of the drive assistance electric motor to a minimum during the second control, upon detecting the pedaling force approaches a prescribed minimum value. With this aspect, when the pedaling force is at a minimum, the output of the gear shifting electric motor is also at a minimum. Thus, a total drive force goes to a minimum. As a result, at the same timing, a load acting on the transmission and/or the chain becomes smaller and the transmission can change gears more readily.

In accordance with a fourth aspect, the bicycle drive apparatus according to the third aspect is provided such that the pedaling force measuring sensor measures a rotary torque acting on a crank axle of the bicycle crankset as the pedaling force. During gear shifting, it is preferable for the rotary torque acting on the crank axle to be smaller in order to decrease the load acting on the transmission and/or the chain. With this aspect of the invention, the gear shifting operation can be executed smoothly because the output of the drive assistance electric motor goes to a minimum and the total drive force goes to a minimum when the rotary torque goes to a minimum.

In accordance with a fifth aspect, the bicycle drive apparatus according to the third aspect or fourth aspect is provided such that the output control section determines that the bicycle crankset is in the prescribed range upon determining a pedaling force of the bicycle crankset is in a prescribed range. With this aspect, it can be determined if the crankset is in the prescribed range based on the measurement result of the pedaling force. Since an independent sensor is not required to determine if the crankset is in the prescribed range, the structure of a bicycle utilizing the present invention can be simplified.

In accordance with a sixth aspect, the bicycle drive apparatus according to any one of the first to fourth aspects further comprises a crank position sensor that detects a position of the bicycle crankset. The output control section determines if the bicycle crankset is in the prescribed range based on a detection result of the crank position sensor. With this aspect, the detecting section reliably determines if the crank is in the prescribed range. Consequently, it is easier to control the output of the drive assistance electric motor in an optimum manner and easier to achieve a smooth gear shifting operation in a reliable manner.

In accordance with a seventh aspect, the bicycle drive apparatus according to any one of the first to sixth aspects is provided such that the transmission is an internal transmission. The internal transmission is a transmission that uses gear wheels. Depending on the position where the internal transmission is installed, it may be called a rear wheel hub transmission or a crank axle transmission. With this internal transmission, although gear shifting operations are generally smoother when the transmitted torque is smaller than when the transmitted torque is larger, a smooth gear shifting operation can be accomplished when the crank is in the prescribed range including top and bottom dead center according to the present invention because the torque imposed on the transmission is smaller.

In accordance with an eighth aspect, the bicycle drive apparatus according to any one of the first to sixth aspects is provided such that the transmission is an external transmission. An external transmission is a transmission in which gear shifting is accomplished by moving the chain between sprockets using a derailleur. A front derailleur that moves the chain between sprockets of the crank axle and/or a rear derailleur that moves the chain between sprockets of the rear wheel are operated with a wire (cable) extending from a shifter or an electric motor in order to change gears. With this external transmission, a gear shifting operation is not adversely affected when some degree of tension exists in the chain, but gear shifting is difficult when an excessive amount of tension exists in the chain. However, with the present invention, gear shifting operations are smooth because they are executed when the crank is in the prescribed range including the top and bottom dead centers such that excessive tension does not exists in the chain during the gear shifting operations.

In accordance with a ninth aspect, the bicycle drive apparatus according to any one of the first to eighth aspects is provided such that the drive assistance electric motor is configured to drive a bicycle chain. With this aspect, the chain that transmits a pedaling force of a person to the crank is driven directly or indirectly by the drive assistance electric motor. Gear shifting operations are smooth because the gear shifting operations are executed when the crank is in the prescribed range including the top and bottom dead centers and the tension of the chain is smaller according to the present invention.

With the bicycle drive apparatus, as described in more detail below, when a shift command is received, the control of the output of the drive assistance electric motor is switched such that, during a period when it is determined that the crankset is within the prescribed range of at least one of the top and bottom dead centers, the output of the drive assistance electric motor is smaller than before the shift command was received. As a result, a load acting on the transmission and/or a chain tends to be smaller during gear shifting and gear shifting can be executed smoothly. Meanwhile, if the crankset is outside the prescribed range after the shift command is received, then the same output is obtained from the drive assistance electric motor as before the shift command was received such that an increase of the load born by the rider is suppressed.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
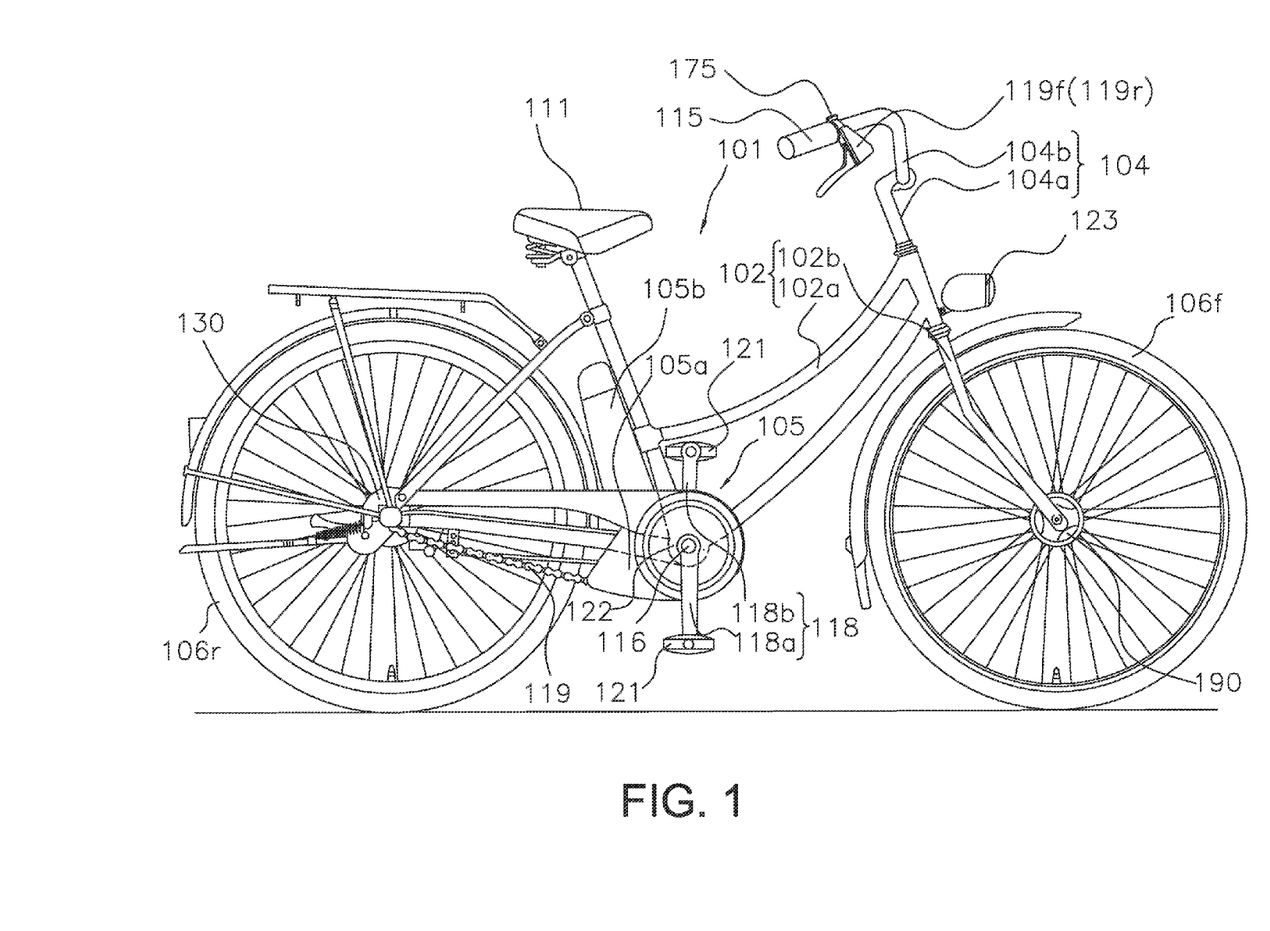
FIG. 1 is a side elevational view of a bicycle in which a bicycle drive apparatus is employed in accordance with a first embodiment.

FIG. 1 shows a bicycle 1 that employs a first embodiment of the present invention. The bicycle 1 is an assisted bicycle configured to assist a rider by using an assist mechanism 105a to supplement a drive three (e.g., a pedaling force) imparted by the rider. The bicycle 101 comprises a frame 102 having a frame body 102a and a front fork 102b, a handlebar unit 104, a drive unit 105, a front wheel 106f, a rear wheel 106r, a front brake device and a rear brake device not shown in the figure, and a headlamp 123. The bicycle 101 also has the electrical system 150 shown in FIG. 2, which comprises a plurality of electrical components for the bicycle. Electrical components provided are a control unit 151, the assist mechanism 105a, a rechargeable battery 105b, a hanger unit 122a, a gear shifting unit 170, the headlamp 123, a gear shifter 175, a dynamo hub 190.

In the explanations that follow, positional relationships are explained using the words "left" and "right." The words "left" and "right" refer to the left and right directions of the bicycle 101 as viewed from the rear.

As shown in FIG. 1, the front fork 102b is attached to a frontward portion of the frame body 102a such that it can pivot about a slanted axis. The headlamp 123 is an energy conserving type that uses an LED and is provided on a frontward face of the front fork 102b. A saddle 111, the handlebar unit 104, and other components are attached to frame body 102a. A hanger tube 122 is provided on a bottom middle portion of the frame body 2a for supporting a crank axle 116 (explained later).

A hanger unit 122a having a torque sensor 141 and a crank position sensor 142 is provided in the hanger tube 122. The torque sensor 141 measures a rotary torque acting on the crank axle 116 (explained later) to be used as a pedaling force. The torque sensor 141 is an example of a measuring section or a pedaling force measuring sensor that measures a pedaling force. The torque sensor 141 measures a torque of the crank axle 116 either in a non-contact manner or by contacting the crank axle 116 or the crank arms 118 fixed to both ends of the crank axle 116. The torque sensor 141 is, for example, a magnetorestrictive sensor having a magnetorestrictive element provided on the crank axle 116 and a detection coil arranged facing opposite the magnetorestrictive element, a strain gauge provided on the crank axle 116 or the crank arms 118, or a strain gauge provided on the hanger tube 122 supporting the crank axle 116. The torque sensor 141 is not limited to these configurations and any sensor whose output varies according to the torque acting on the crank axle 116 is acceptable. The crank position sensor 142 is a sensor for ascertaining the position of the crank arms 118 and serves to detect whether or not the crank arms 118 are positioned in a prescribed range with respect top and bottom dead center positions. The crank position sensor 142 is an example of a detecting section that detects a position of the crank.

The crank position sensor 142 will now be explained in detail. The crank position sensor 142 is installed onto the bicycle 101 as shown in FIG. 3 in order to detect the positions of the crank arms 118 fixed to each of both ends of the crank 116. The crank position sensor 142 has a magnet 45 provided on the crank arms 118 and a first Hall element 46a and a second Hall element 46b provided on the hanger tube 122 of the frame body 102a. The permanent magnet 45, the first Hall Effect element 46a and the second Hall Effect element 46b is one example of the bicycle crank position sensor 142 of FIG. 2. The first and second Hall Effect elements 46a and 46b are examples of magnetic force detecting elements.

The magnet 45 has an annular shape, and has an S pole 45a and an N pole 45b arranged closely adjacent to one another along a circumferential direction. The magnet 45 is fixed to the crank arms 118 with a fastening member 48. The fastening member 48 comprises, for example, a plurality of screws. The S pole 45a and the N pole 45b are arranged around an outer circumference of the crank axle 116 and, in the embodiment, each has a semicircular shape. For example, it is as though the magnet 45 were divided by a plane containing a center of the crank axle 116 and one side constitutes the S pole 45a and the other side constitutes the N pole 45b. Since the S pole 45a and the N pole 45b are closely adjacent, there are two borders. The borders are separated by 180 degrees about the crank axle 116. A first border line 45c and a second border line 45d corresponding to the borders between the S pole 45a and the N pole 45b are arranged along a lengthwise directions of the right cranks 118. More preferably, the first border line 45c and the second border line 45d are provided in a plane N that contains a rotational axis of the crank axle 116 and an axial centerline of the mounting holes of each of pedals 121. At the first border line 45c, the N pole 45b is arranged on an upstream side in a counterclockwise direction and the S pole 45a is arranged on a downstream side. At the second border line 45d, the S pole 45a is arranged on an upstream side in a counterclockwise direction and the N pole 45b is arranged on a downstream side.

The first Hall element 46a and the second Hall element 46b are attached to the hanger tube 122 in positions facing the magnet 45. The magnet 45 faces the first Hall element 46a and the second Hall element 46b along an axial direction of the crank axle 116. The first Hall element 46a and the second Hall element 46b are each arranged to correspond to a prescribed range α that includes a bottom dead center of the right crank arm 118 or a bottom dead sensor of the left crank arm 118 (top dead center of the right crank arm 118). The prescribed range a is a range spanning, for example, 15° from a reference position arranged at the bottom dead center or top dead center position of the crank arm 118 in both rotational directions of the crank arm 118. Thus, the prescribed range α corresponds to, for example, a 30° rotational angle of the crank arm 118. The rotational angle of the crank arms 118 corresponding to the prescribed range α is preferably within the range of 20 to 40 degrees.

The handlebar unit 104 has a handlebar stem 104a that is fastened atop the front fork 102b and a handlebar 104b that is fastened to the handlebar stem 104a. The handlebar 104b has a right brake lever 119f and left brake lever 119r and grips 115 arranged on both ends. The gear shifter 175 for operating the gear shifting unit 170 (explained later) with one's hand is attached on the rider's side at a portion where the right brake lever 119f is attached.

The right brake lever 119f is connected to a front brake device by a front brake cable (not shown). The left brake lever 119r is connected to a rear brake device by a rear brake cable (not shown).

Figure 2:
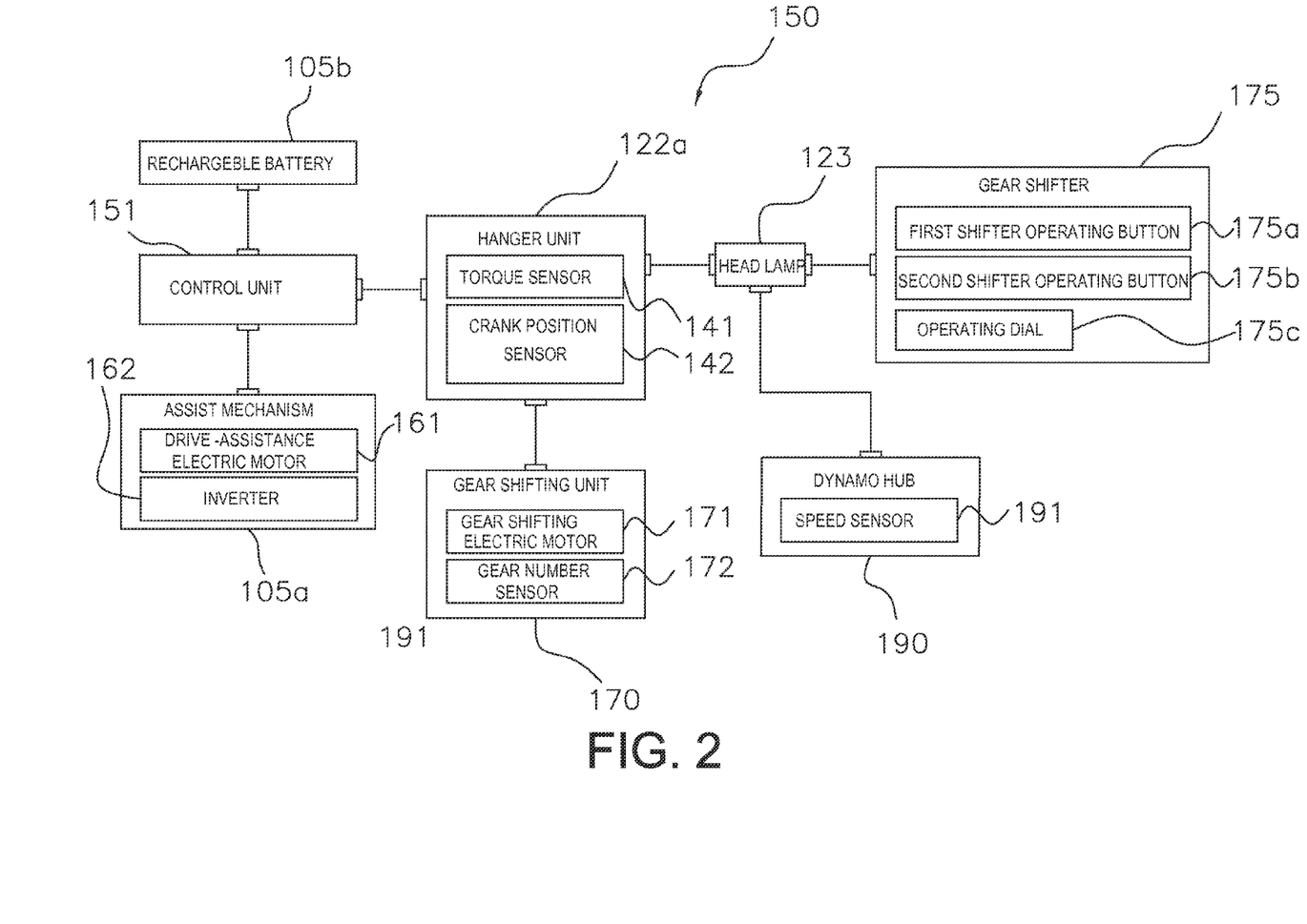
FIG. 2 is a block diagram showing constituent features of a bicycle electrical system of the bicycle in which the first embodiment of the present invention is employed.
Figure 3:
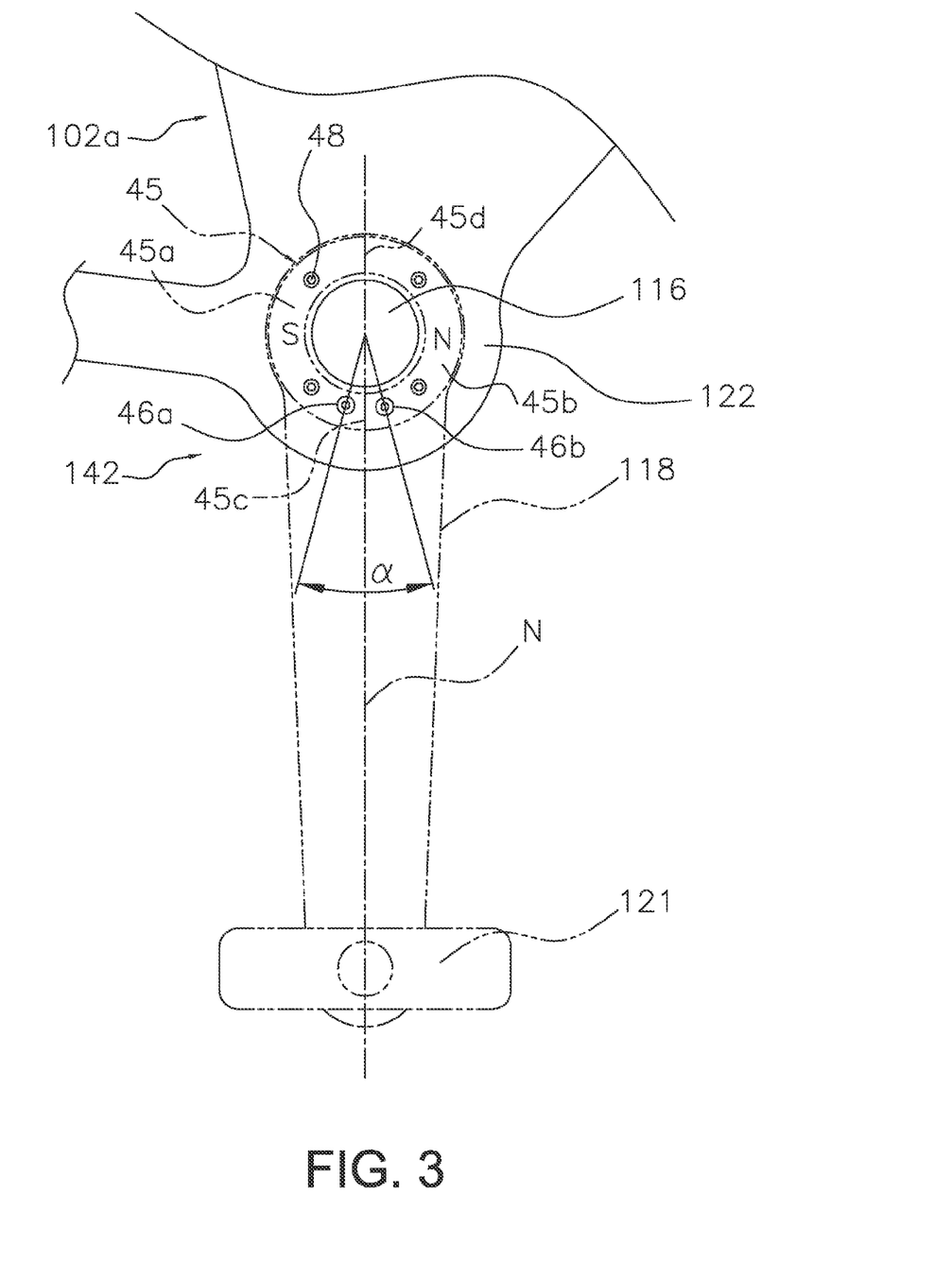
FIG. 3 is an enlarged frontal view of a crank position sensor.
Figure 4:
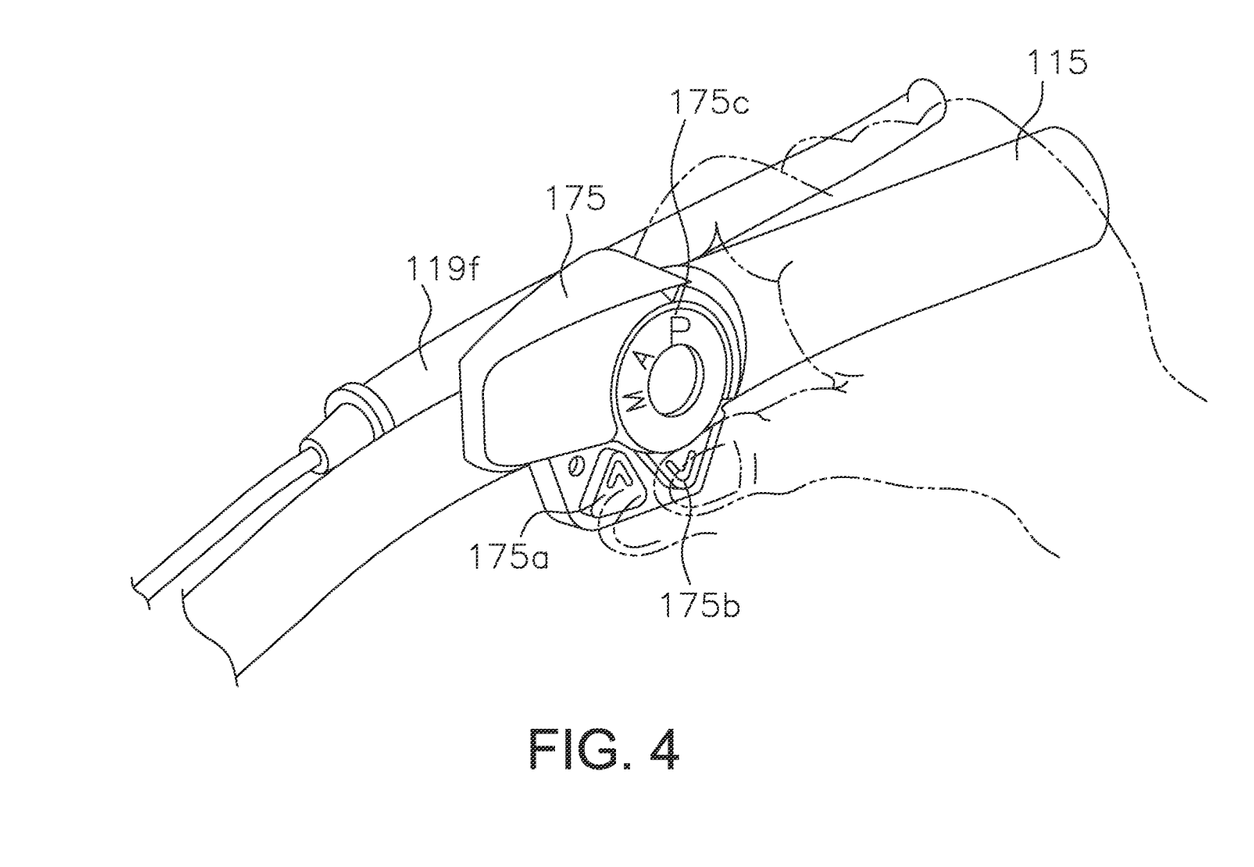
FIG. 4 is a perspective view of a handlebar unit of the bicycle.

As shown in FIG. 2 and FIG. 4, the gear shifter 175 has a first shifter operating button 175a, a second shifter operating button 175b, and an operating dial 175c. As shown in FIG. 4, the first and second shifter operating buttons 175a and 175b and the operating dial 175c are positioned such that a person can operate them with a finger while gripping the grips 115 of the handlebar 104b.

The first and second shifter operating buttons 175a and 175b are pushbuttons. The first shifter operating button 175a is a button for shifting from a lower gear to a higher gear. The second shifter operating button 175b is a button for shifting from a higher gear to a lower gear. The operating dial 175c is a dial for switching between two shift modes and a parking (P) mode and has three stop positions: P, A and M. The two shift modes are an automatic shifting mode (A) and a manual shifting mode (M) The automatic shifting mode is a mode in which an internally geared hub 130 is shifted automatically based on a bicycle speed signal from a speed sensor 191 (explained later). The manual shifting mode is a mode in which a rider shifts the internally geared hub 130 to any desired gear by operating the shifter operating buttons 175a and 175b. In the manual shifting mode, the shifter operating buttons 175a and 175b are examples of shift command receiving sections or shift command receiving devices. The parking mode is a mode in which the internally geared hub 130 is locked such that rotation If the rear wheel 106r is restricted; the parking mode is not used when the bicycle is ridden.

The drive unit 105 comprises the crank axle 116 rotatably supported in the hanger tube 122 of the frame body 102a, crank arms 118 fixed to opposite ends of the crank axle 116, a chain 119, a assist mechanism 105a that assists with propelling the bicycle by driving the chain 119, a rechargeable battery 105b that is detachable, and an internally geared hub 130. The crank arms 118 comprise a right crank arm 118a and a left crank arm 118b. The crank axle 116, the right crank arm 118a and the left crank arm 118b form a crankset. Pedals 121 are attached to tip ends of the right crank arm 118a and the left crank arm 118b. The right crank arm 118a and the left crank arm 118b are 180 degrees out of phase. The chain 119 is arranged on a front sprocket fixed to the crank axle 116 and a rear sprocket provided on the internally geared hub 130.

As shown in FIG. 2, the assist mechanism 105a has a drive assistance electric motor 161 and an inverter 162. The drive assistance electric motor 161 is, for example, a three-phase brushless DC motor or an AC motor. The inverter 162 converts a direct current outputted from the rechargeable battery 105b into an alternating current suitable for driving the drive assistance electric motor 161. In addition to serving as an electric power source for the assist mechanism 105a, the rechargeable battery 105b is also used as an electric power source for, for example, the headlamp 123 and the gear shifting unit 170 (explained later). The rechargeable battery 105b is, for example a nickel hydrogen battery or a lithium ion battery. The drive assistance electric motor 161 can drive the chain direction or indirectly. For example, it is acceptable for the drive assistance electric motor 161 to drive the chain through a reduction gear mechanism or to drive the crank through a reduction gear mechanism.

The internally geared hub 130 is arranged in a center portion of the rear wheel 106r and is driven by the chain 119. The internally geared hub is an example of a transmission. The internally geared hub 130 has, for example, eight speeds. A rear brake device comprising, for example, a roller brake, a band brake, or a disk brake is connected to the internally geared hub 130. The gear shifting unit 170 is connected to the internally geared hub 130 and serves to electrically drive a gear shifting mechanism that comprises a planetary gear mechanism. As shown in FIG. 2, the gear shifting unit 170 has a gear shifting electric motor 171 for driving the gear shifting mechanism of the internally geared hub 130 and a gear number sensor 172 for detecting a gear number indicating the gear position.

The dynamo hub 190 is an alternating current generator provided in a center portion of the front wheel 106f. The dynamo hub 190 is connected to a front brake device comprising, for example, a roller brake, a band brake, or a disk brake. If a roller brake, a band brake, a disk brake or other type of front brake is not connected to the dynamo hub 190, then a V-brake, a cantilever brake or other brake device should be provided on the front fork 102b. The speed sensor 191 is provided in the dynamo hub 190 and serves to measure a bicycle speed of the bicycle. It is acceptable to provide a speed sensor 191 that is separate from the dynamo hub 190 in the dynamo hub 190 or to use the dynamo hub 190 itself as the bicycle speed sensor 191. When the speed sensor 191 is provided as a separate entity from the dynamo hub 190, the speed sensor 191 might comprise, for example, a magnet attached to a rotating portion of the dynamo hub 190 and reed switch or a Hall element attached to a non-rotating portion of the dynamo hub 190. When the dynamo hub 190 itself is used as the speed sensor 191, a traveling speed of the bicycle is calculated based on an alternating current waveform outputted from the dynamo of the dynamo hub 190. The speed sensor 191 is an example of a traveling speed measuring section. Although in this embodiment the speed sensor 191 is provided in the dynamo hub 190, it is acceptable to use a speed sensor comprising, for example, a magnet attached to a spoke and a reed switch or a Hall element attached to the frame.

Figure 5:
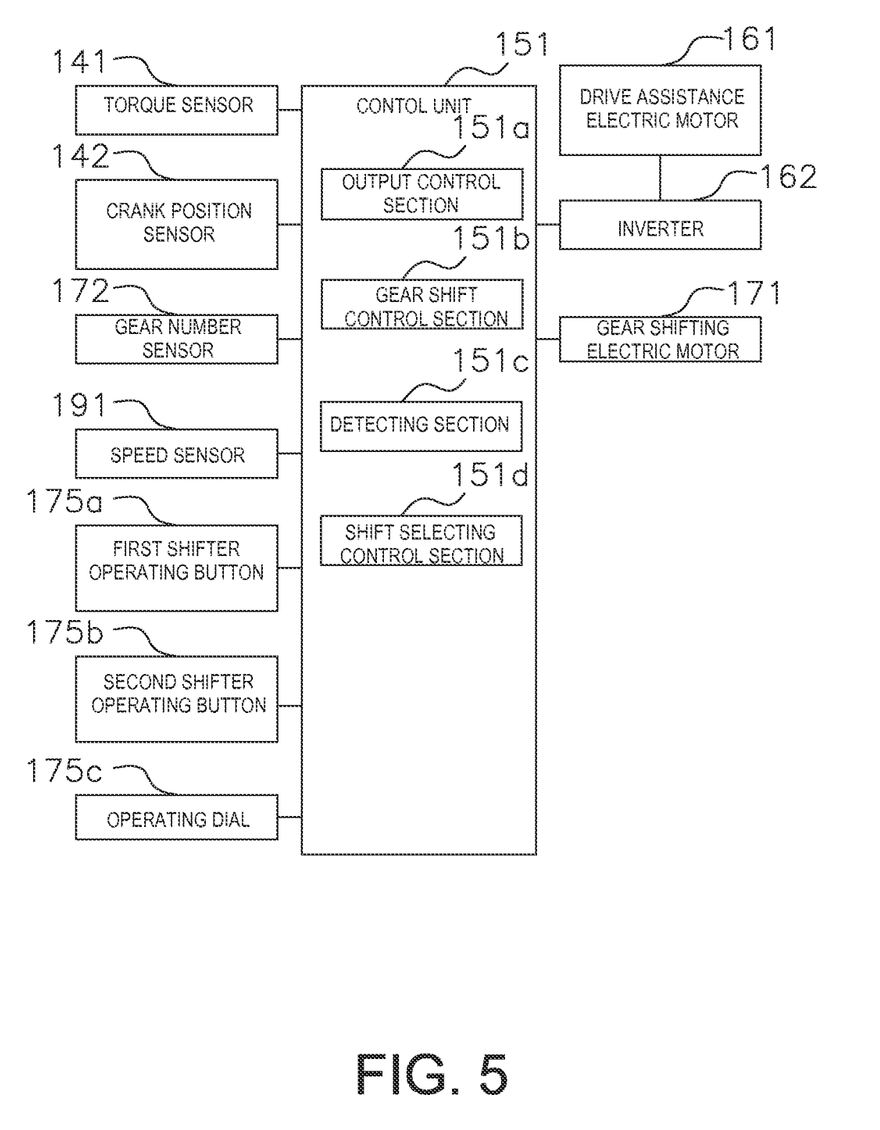
FIG. 5 is a block diagram of a bicycle drive apparatus according to the first embodiment.

The control unit 151 of the bicycle control apparatus used with the bicycle 101 will now be explained. The control unit 151 has a microcomputer and serves to control electric components that are connected to the control section 12. The microcomputer includes a CPU (central processing unit), a RAM (random access memory), a ROM (read only memory), and an I/O interface. As shown in FIG. 5, the control unit 151 has the following functional sections: an output control section 151a, a gear shift control section 151b, a detecting section 151c, and a shift selecting section 151d.

During an assist mode, the output control section 151a varies the output of the drive assistance electric motor 161, which serves as an assisting force, in accordance with a pedaling force. More specifically, output control section 151 executes a control such that the output of the drive assistance electric motor 161 becomes equal to a product of a prescribed value and the pedaling force detected by the torque sensor 141. The output control section 151a controls the drive assistance electric motor 161 in a plurality of assist modes. The output control section 151a has three assist modes, namely a high assist mode that assists with an assist force up to a maximum of 2 times the pedaling force, a medium assist mode that assists with an assist force up to a maximum of 1.5 times the pedaling force, and a low assist mode that assists with an assist force up to a maximum of 1 times the pedaling force. It is acceptable for the assist modes to be changed using a switch (not shown) provided on the handlebar unit 104 or using the operating dial 175c.

Figure 6A:
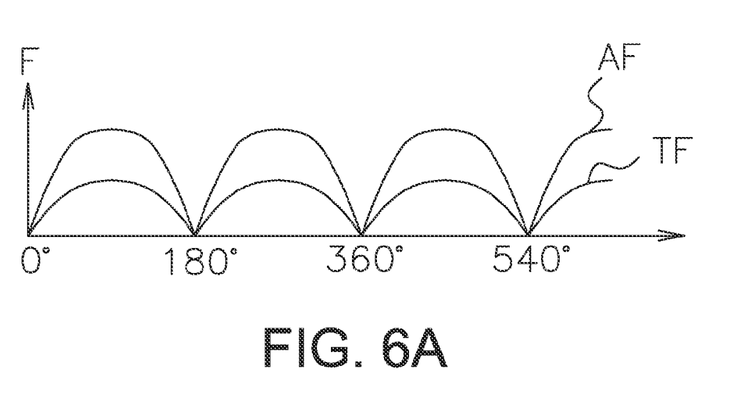
FIG. 6A shows an example of an output of a drive assistance electric motor when a control for suppressing pulsation of the drive assistance electric motor is not executed (example of the output of the drive assistance electric motor during a second control)
Figure 6B:
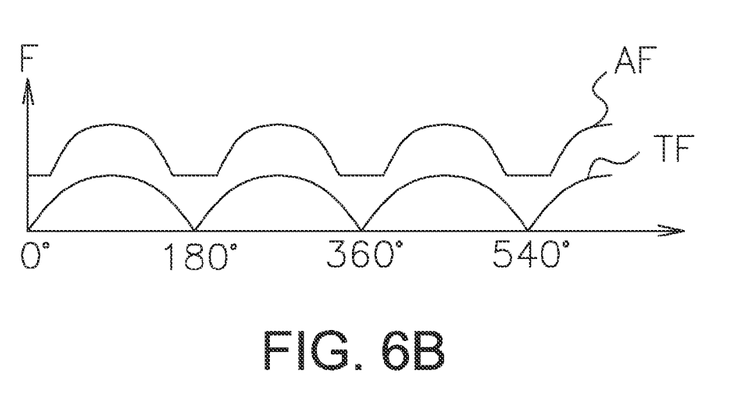
FIG. 6B shows an example of an output of the drive assistance electric motor when a control for suppressing pulsation of the drive assistance electric motor is executed (example of the output of the drive assistance electric motor during a first control)

However, if the output (AF) of the drive assistance electric motor is set to the product of the pedaling force (TF) detected by the torque sensor 141 and a prescribed value, then the output of the drive assistance electric motor 161 will decrease to approximately zero when the crank arms are near top and bottom dead center positions where the pedaling force decreases nearly to zero. As a result, as shown in FIG. 6A, the output of the drive assistance electric motor 161 will pulsate repeatedly on and off and adversely affect the comfort of the rider. In the graphs shown in FIG. 6, the horizontal axis indicates the crank position and the vertical axis indicates the pedaling force and the output of the drive assistance electric motor. Therefore, in each of the assist modes, a control is executed to avoid the pulsation. More specifically, when the detecting section 175c (explained later) detects that the cranks arms 118 are in a prescribed range including the top and bottom dead centers, the output of the drive assistance electric motor 161 is held at a fixed value as shown in FIG. 6B. The fixed value is, for example, the output value of the drive assistance electric motor 161 at the point in time when it was detected that the crank arms 118 are in the prescribed range including the top and bottom dead centers. This control, called a "first control mode," serves to prevent the output of the drive assistance electric motor 161 from repeatedly turning on and off.

In addition to the first control mode just explained, the output control section 151a also has a second control mode that is executed when a shift command has been received. The second control mode makes the output of the drive assistance electric motor 161 smaller than during execution of the first control mode only when the detecting section 175c detects that the crank arms 118 are in a prescribed range including the top and bottom dead centers. More specifically, during the second control mode, for example, the control that avoids pulsation during the previously explained first control mode is not executed. That is, as shown in FIG. 6A, the drive assistance electric motor 161 is controlled to continuously deliver an output equal to the product of the pedaling force and a prescribed value. Thus, in the second control mode, the output of the drive assistance electric motor 161 becomes small when the crank arms 118 are in a vicinity of the top and bottom dead centers were the pedaling force is small. More particularly, at the top and bottom dead center positions where the pedaling force goes to a minimum, the output of the drive assistance electric motor 161 also goes to a minimum. As a result, substantially no drive force acts on the chain 119 when the crank arms 118 are in a vicinity of the top and bottom dead centers.

The gear shift control section 151b instructs the gear shifting electric motor 171 to operate at a prescribed timing explained later. As will be explained later, the gear shift control section 151b receives shift commands from the shift selecting section 151d during the automatic shifting mode and, thus, the gear shift control section 151b is an example of a shift command receiving section.

The detecting section 151c detects if either of the left and right crank arms 118 is in a prescribed range α including a bottom dead center position based on output from the crank position sensor 142. The section will now be explained in more detail.

The detecting section 151c detects if the right crank arm 118a and the left crank arm 118b are in one of four ranges based on a combination of outputs from the first element 46a the second Hall element 46b. For example, the first Hall element 46a and the second Hall element 46b are both configured to produce a low (L) level output when they are facing the S pole 45a and a high (H) level output when they are facing the N pole 45b. Combinations of the output signals from the first Hall element 46a and the second element 46b are categorized into a first combination A1, a second combination A2, a third combination A3, and a fourth combination A4.

Figure 7A:
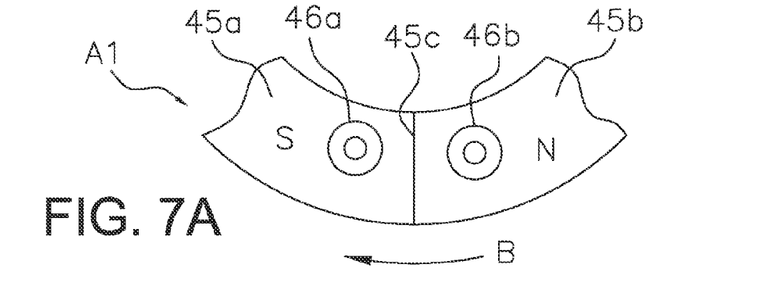
FIGS. 7A to 7D illustrates an operating example how a detecting section determines a crank position.

FIG. 7A shows an example of positions of the first Hall element 46a, the second Hall element 46b, and the magnet 45 when the output signals form the first combination A1. In the first combination A1, the output of the first Hall element 46a is at the low (L) level and the output of the second Hall element 46b is at the high (H) level. The outputs of the first Hall element 46a and the second Hall element 46b form the first combination A1 when the right crank arm 118a is in the prescribed range α that includes the bottom dead center position. When the outputs of the first element 46a and the second element 46b form the first combination A1, the first border line 45c of the magnet 45 is positioned between the first element 46a and the second Hall element 46b in a side view of the bicycle 101 as shown in FIG. 7A.

Figure 7B:
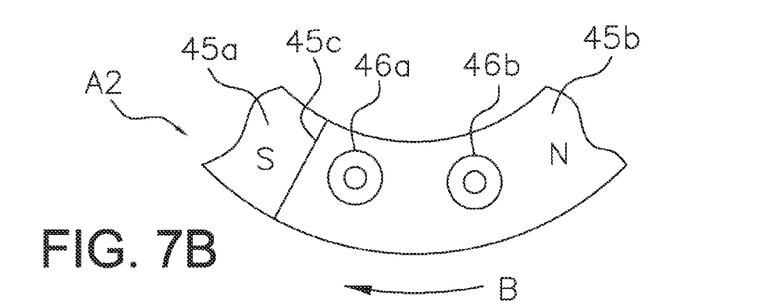

FIG. 7B shows an example of positions of the first Hall element 46a, the second Hall element 46b, and the magnet 45 when the output signals form the second combination A2. In the second combination A2, the outputs of the first Hall element 46a and the second Hall element 46b are both at the H level. The outputs of the first Hall element 46a and the second Hall element 46b form the second combination A2 when the right crank arm 118a has been rotated in the direction of an arrow B (clockwise when viewed from the right side of the bicycle 101) from the prescribed range α including the bottom dead center position to such an extent that the first border line 45c of the magnet 45 has passed the first Hall element 46a but the left crank arm 118b has not yet entered the prescribed range a including the bottom dead center position.

Figure 7C:
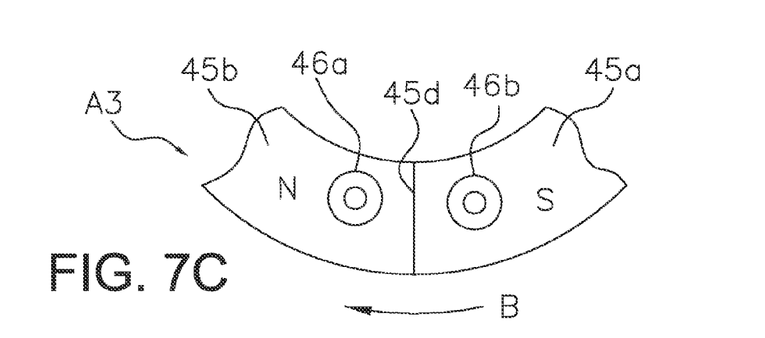

FIG. 7C shows an example of positions of the first Hall element 46a, the second Hall element 46b, and the magnet 45 when the output signals form the third combination A3. In the third combination A3, the output of the first Hall element 46a is at the H level and the output of the second Hall element 46b is at the L level. The outputs of the first Hall element 46a and the second Hall element 46b form the third combination A3 when the left crank arm 118b is in the prescribed range α that includes the bottom dead center position. When the outputs of the first Hall element 46a and the second Hall element 46b form the third combination A3, the second border line 45d of the magnet 45 is positioned between the first Hall element 46a and the second Hall element 46b in a side view of the bicycle 101 as shown in FIG. 7C.

Figure 7D:
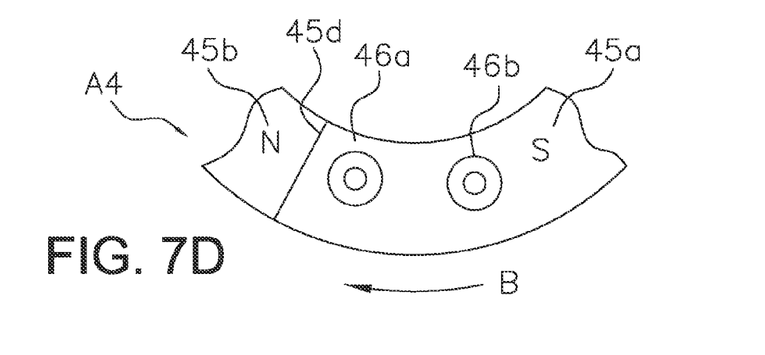

FIG. 7D shows an example of positions of the first Hall element 46a, the second Hall element 46b, and the magnet 45 when the output signals form the fourth combination A4. In the fourth combination A4, the outputs of the first Hall element 46a and the second Hall element 46b are both at the L level. The outputs of the first Hall element 46a and the second Hall element 46b form the fourth combination A4 when the left crank arm 118b has been rotated in the direction of an arrow B (clockwise when viewed from the right side of the bicycle 101) from the prescribed range α including the bottom dead center position to such an extent that the second border line 45d of the magnet 45 has passed the first Hall element 46a but the right crank arm 118a has not yet entered the prescribed range α including the bottom dead center position.

The shift selecting section 151d recognizes the shift mode set by the operating dial 175c and executes the shift control corresponding to the recognized mode.

If the recognized mode is the automatic shifting mode (A), then the shift selecting section 151d selects a gear to be changed to according to the bicycle speed measured by the speed sensor 191 and commands the gear shift control section 151b to change to the selected gear. In the automatic shifting mode, the gear shift control section 151b functions as a shift command receiving section. The selection of the gear to be changed to is accomplished based on a table that stores a mapped relationship among bicycle speed, pedaling force value, and gear. Basically, the shift selecting section 151d holds two different tables for automatic shifting and uses one table or the other depending on the pedaling force detected by the torque sensor 141. More specifically, a table for a high torque mode and a table for a normal mode are stored and both tables store bicycle speed threshold values for upshifting and downshifting in the automatic shifting mode. The bicycle speed threshold values stored for the high torque mode are bicycle speed threshold values tier when the pedaling force value is equal to or larger than a prescribed value, and the bicycle speed threshold values stored for the normal mode are bicycle speed threshold values for when the pedaling force value is smaller than a prescribed value.

Meanwhile, the shift selecting section 151d does not issue shift commands when it detects that the operating dial 175c is set to the manual shifting mode (M). In the manual shifting mode, a desired gear shift is commanded by the rider operating the first or the second shifter operating button 175a or 175b provided on the gear shifter 175.

Figure 8:
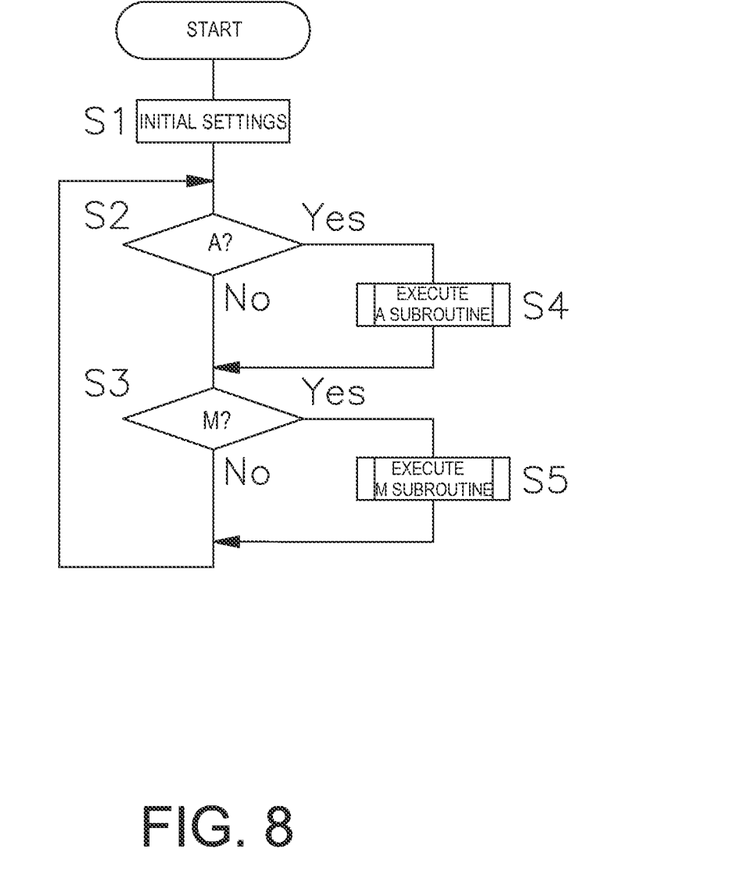
FIG. 8 is a flowchart showing an example of a main routine of a shift control.
Figure 9:
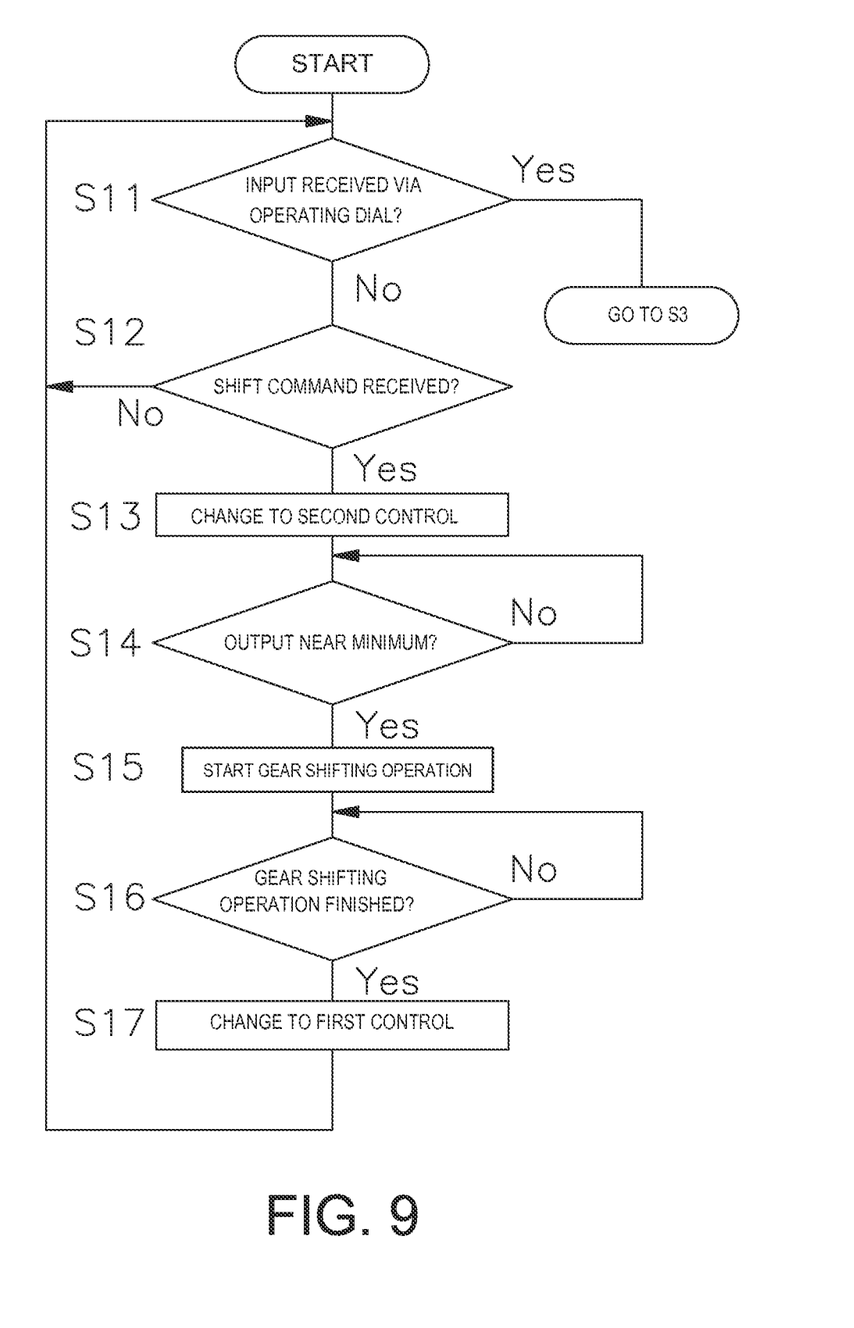
FIG. 9 is a flowchart showing an example of an automatic shifting subroutine.
Figure 10:
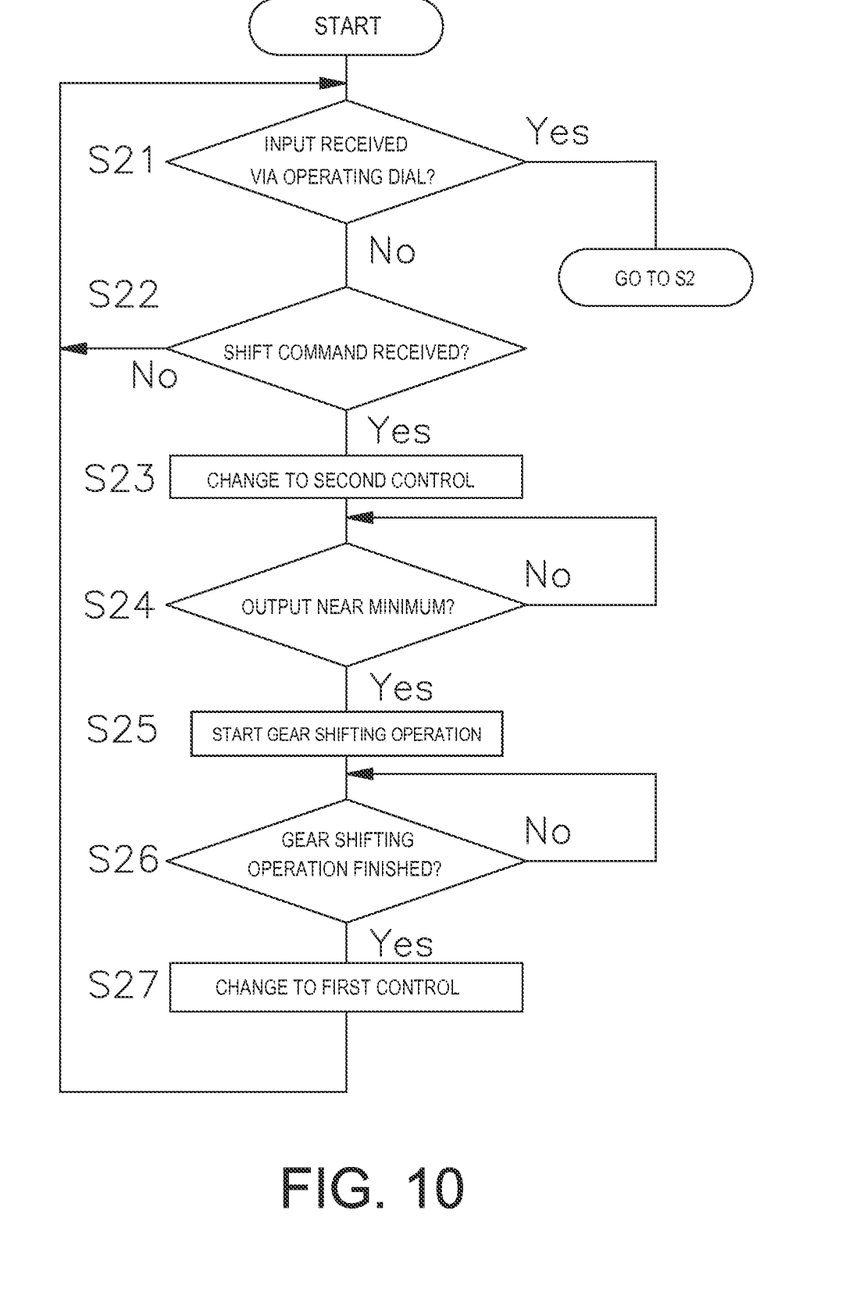
FIG. 10 is a flowchart showing an example of a manual shifting subroutine.
Figure 11:
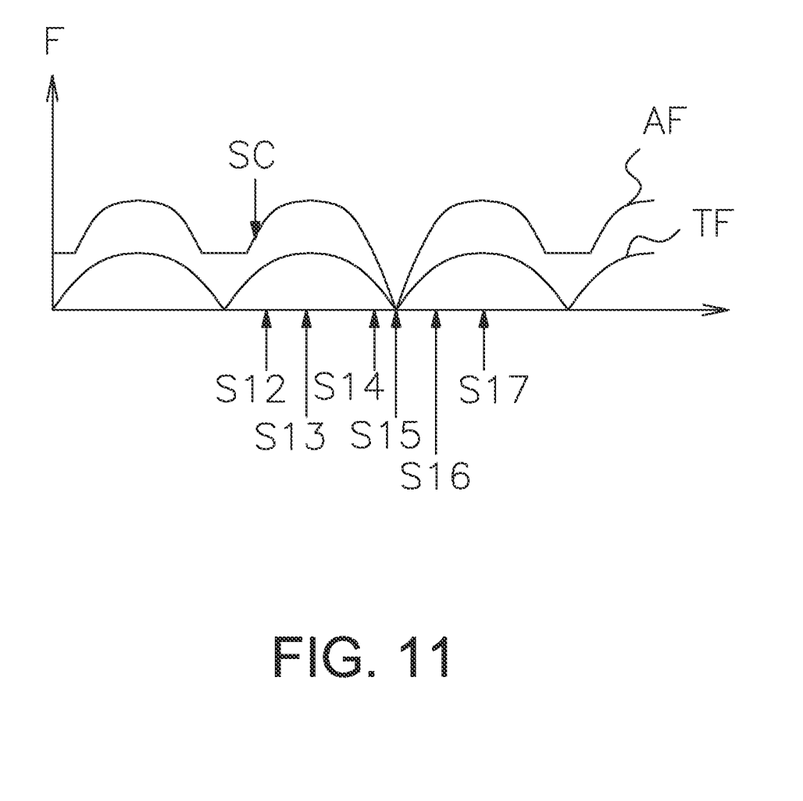
FIG. 11 is an example of how the output of the drive assistance electric motor varies during gear shifting.

The control operations executed by the bicycle control apparatus during assistance will now be explained based on the flowcharts shown in FIGS. 8 to 10 and the example of the output of the drive assistance electric motor 161 during gear shifting shown in FIG. 11. In the graphs shown in FIG. 11, the horizontal axis indicates the crank position and the vertical axis indicates the pedaling force and the output of the drive assistance electric motor.

First, an example of a main routine of the shift control will be explained using the flowchart shown in FIG. 8.

After the power is turned on, the bicycle control apparatus executes initial settings in step S1. In step S2 the shift selecting section 151d determines if the operating dial 175c is set to the automatic shifting mode (A), and in step S3 the shift selecting section 151d determines if the operating dial 175c is set to the manual shifting mode (M). If the operating dial 175c is set to the automatic shifting mode, then the control unit 151 proceeds from step S2 to step S4. In step S4, the control unit 151 executes an automatic shifting subroutine explained later. If the operating dial 175c is set to the manual shifting mode, then the control unit 151 proceeds from step S3 to step S5. In step S5, the control unit 151 executes a manual shifting subroutine explained later.

The automatic shifting subroutine will now be explained based on FIG. 9 and FIG. 11. FIG. 9 is a flowchart showing an example of an automatic shifting subroutine. FIG. 11 is an example of how the output (AF) of the drive assistance electric motor 161 varies during gear shifting. The step numbers of the automatic shifting subroutine are indicated in FIG. 11 to illustrate the relationship between each of the steps and the output variation of the drive assistance electric motor 161. In FIG. 11, "SC" indicates the timing at which the shift selecting section 151d issues a shift command.

In step S11, the shift selecting section 151d determines if the operating dial 175c has been operated. If the operating dial 175c has been operated, then the control unit 151 returns to the main routine and proceeds to step S3. If the operating dial 175c has not been operated, then the control unit 151 proceeds to step S12.

In step S12, the shift selecting section 151d selects a gear based on the bicycle speed measured by the speed sensor 191 as explained previously. If the selected gear and the current gear are different, then the shift selecting section 151d issues a shift command to the gear shift control section 151b instructing it to shift to the selected gear. If the gear shift control section 151b receives a shift command from the shift selecting section 151d, then the control unit 151 proceeds to step S13. If the gear shift control section 115b does not receive a signal, then the control unit 151 returns to step S11.

In step S13, the output control section 151a changes the output control pattern from the first control to the second control.

In step S14, the output control section 151a determines if the output of the drive assistance electric motor 161 is within a prescribed amount of a minimum value. More specifically, it determines if the output of the drive assistance electric motor 161 is smaller than a prescribed value. In this embodiment, since the output of the drive assistance electric motor 161 is proportional to the pedaling force during the second control, it is acceptable to determine if the value of the pedaling force detected by the torque sensor 141 is smaller than a prescribed value. If the output of the drive assistance electric motor 161 is determined to be near a minimum value, then the control unit 151 proceeds to step S15.

In step S15, the gear shift control section 151b issues a command to the gear shifting electric motor 171 instructing it to operate such that it shifts the internally geared hub 130 to the gear indicated by the shift selecting section 151d.

In step S16, the gear shift control section 151b determines if the gear number of the internally geared hub 130 detected by the gear number sensor 172 matches the gear indicated by the shift selecting section 151d. If so, then the control unit 151 determines that the shifting operation is completed and proceeds to step S17.

In step S17, the output control section 151a changes the output control pattern from the second control to the first control. The control unit 151 then returns to step S11.

A manual shifting subroutine will now be explained based on FIG. 10. FIG. 10 is a flowchart showing an example of an automatic shifting subroutine. If the step numbers S12 to S17 shown in FIG. 11 are replaced with the step numbers S22 to S27, then the variation of the output (AF) of the drive assistance electric motor 161 shown in FIG. 11 can also be used to explain the manual shifting subroutine. In such a case, "SC" in FIG. 11 indicates the timing at which a rider operated the first or second shift operating button 175a and 175b and thereby issued a shift command.

In step S21, the shift selecting section 151d determines if the operating dial 175c has been operated. If the operating dial 175c has been operated, then the control unit 151 returns to the main routine and proceeds to step S2. If the operating dial 175c has not been operated, then the control unit 151 proceeds to step S22.

In the step S22, the control unit 151 determines if the first shifter operating button 175a or the second shifter operating button 175b of the gear shifter 175 has received a shift command. If a signal has been received, then the control unit 151 proceeds to step S23. If a signal has not been received, then the control unit 151 returns to step S21.

In step S23, the output control section 151a changes the output control pattern from the first control to the second control.

In step S24, the output control section 151a determines if the output of the drive assistance electric motor 161 is near a minimum value smaller than a prescribed value. As explained previously, in this embodiment it is also acceptable to determine if the value of the pedaling force measured by the torque sensor 141 is smaller than a prescribed value. If the output of the drive assistance electric motor 161 is determined to be near a minimum value, then the control unit 151 proceeds to step S25.

In step S25, the gear shift control section 151b commands the gear shifting electric motor 171 to operate such that the internally geared hub 130 is shifted in the shift direction indicated by the gear shifter 175 (from a lower gear to a higher gear or from a higher gear to a lower gear).

In step S26, the gear shift control section 151b determines if the gear number of the internally geared hub 130 detected by the gear number sensor 172 matches the command content issued from the gear shifter 175 to determine if the gear shift has been completed. If it is determined that the gear shift has been completed, then the control unit 151 proceeds to step S27.

In step S27, the output control section 151a changes the output control pattern from the second control to the first control. The control unit 151 then returns to step S21.

Although embodiments of the present invention have been presented heretofore, the present invention is not limited to these embodiments and various modifications can be made without departing from the scope of the invention as defined by the claims.

In the previously explained embodiment, the crank position sensor 142 and the detecting section 151c are used to detect when the crank arms 118 are in the prescribed range including top and bottom dead centers. Instead, it is acceptable for the output control section 151a to determine if the cranks arms 118 are in the prescribed region including top and bottom dead centers without using the crank position sensor 142 and the detecting section 151c.

More specifically, since the pedaling force measured by the torque sensor 141 is substantially zero in a vicinity of the top and bottom dead centers, the output control section 151a can determine that the cranks arms 118 are positioned in a prescribed range including the top and bottom dead centers when the pedaling force is smaller than a prescribed value. In such a case, the crank position sensor 142 and the detecting section 151c can be omitted and the structure of a bicycle utilizing the present invention can be simplified.

In the previously explained embodiment, the present invention is employed in a bicycle 101 in which an internally geared hub 130 constituting an internal transmission is installed on the rear wheel 106r. Instead, it is acceptable for the invention to be employed in a bicycle having a transmission that is installed on the crank axle and configured to change gears using a planetary gear mechanism.

(c) In the previously explained embodiment, the present invention is employed in a bicycle 101 in which an internally geared hub 130 constituting an internal transmission is installed on a rear wheel 106r. Instead, it is acceptable for the invention to be employed in a bicycle equipped with an external transmission having a front derailleur and/or a rear derailleur that are electrically driven. In such a case, execution of gear shifting operations can be avoided when an excessive tension exists in the chain and gear shifting operations can be executed smoothly.

Although in the previously explained embodiment the bicycle has a transmission equipped with a gear shifting electric motor 171, it is not necessary to have a gear shifting electric motor and it is acceptable to use a transmission that is operated manually using a shifter and gear shift wire. In such a case, a sensor for detecting an operation of the shifter or the wire is provided and the sensor outputs a gear shift request when it detects an operation of the shifter or the wire. For example, the sensor is preferably provided on the shifter and configured to output a gear shift request before the wire actually moves when a rider operates an operating part of the shifter.

In the second control of the previously explained embodiment, the drive assistance electric motor continuously supplies an assist force equal to the product of a prescribed value and the pedaling force. Instead, it is acceptable for the second control to, for example, set the output of the drive assistance electric motor 161 to zero or a fixed value smaller than during the first control when the crank arms 118 are in the prescribed range including the top and bottom dead centers.

In the previously explained embodiment, the assist mechanism 105a is arranged in a vicinity of the crank axle 116 and the output of the drive assistance electric motor 161 is transmitted to the chain 119. Instead of the assist mechanism 105a, it is acceptable to install a motor unit for riding assistance on the front wheel 106f. A drive assistance electric motor, an inverter, and a bicycle speed sensor are preferably arranged inside the motor unit.

In the previously explained embodiment, the assist mechanism 105a is arranged in a vicinity of the crank axle 116 and the output of the drive assistance electric motor 161 is transmitted to the chain 119. Instead of the assist mechanism 105a, it is acceptable to install a motor unit for riding assistance on the rear wheel 106r. In such a case, the motor unit is provided on an output side of the transmission.

In the previously explained embodiment, the crank position sensor 142 uses a magnet 45 and Hall elements 46a and 46b. The crank position sensor 142 is not limited to the previously explained configuration and it is acceptable to realize the sensor with, for example, a rotary encoder.

In the previously explained embodiment, the output of the torque sensor 141 is used as the pedaling force, but the invention is not limited to this method of detecting the pedaling force. For example, instead of a torque sensor 141, it is acceptable to provide a sensor that detects a depression force of a pedal or a sensor that detects a tension of the chain.

It is acceptable for a indicator/input device having a touch panel to be fastened to the handlebar unit 104 and such that it can be used for such things as selecting the assist mode, indicating the bicycle speed and gear position, and displaying the remaining capacity of the rechargeable battery 105b.

In the first control of the previously explained embodiment, the output of the drive assistance electric motor 161 is set to a fixed value when the detecting section 175c (explained later) detects that the crank arms 118 are in the prescribed range including the top and bottom dead centers. However, any control is acceptable so long as it suppresses pulsation of the output when the crank arms 118 are in the prescribed range. For example, a ratio of the output of the drive assistance electric motor with respect to the pedaling force can be set to be larger when the crank arms 118 are in the prescribed range than when the crank arms 118 are in another range. Also, for example, a ratio of a change rate of the output of the drive assistance electric motor with respect to the pedaling force can be set to be smaller when the crank arms 118 are in the prescribed range than when the crank arms 118 are in another range.

Moreover, components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive apparatus comprising:
  a bicycle crankset;
  a bicycle transmission;
  a drive assistance electric motor; and
  a microcomputer including
    an output control section having a first control mode and a second control mode that makes an output of the drive assistance electric motor smaller than an output of the drive assistance electric motor occurring during the first control mode only upon determining a crank arm of the bicycle crankset is positioned within a prescribed radial range of at least one of a top dead center position and a bottom dead center position of the bicycle crankset, the output control section being configured to vary the output of the drive assistance electric motor according to a pedaling force, and the output control section switching from the first control mode to the second control mode upon receiving a shift command to shift the transmission.

2. The bicycle drive apparatus as recited in claim 1, wherein
  the transmission includes a gear shifting electric motor;
  the microcomputer further includes a gear shift control section that operates the gear shifting electric motor based on the shift command; and
  the gear shift control section operates the gear shifting electric motor while the output of the drive assistance electric motor is within a prescribed amount of a minimum value during the second control.

3. The bicycle drive apparatus as recited in claim 1, further comprising
a pedaling force measuring sensor that measures a pedaling force; and the output control section controlling the output of the drive assistance electric motor to a minimum during the second control, upon detecting the pedaling force approaches a prescribed minimum value.

4. The bicycle drive apparatus as recited in claim 3, wherein
the pedaling force measuring sensor measures a rotary torque acting on a crank axle of the bicycle crankset as the pedaling force.

5. The bicycle drive apparatus as recited in claim 3, wherein
the output control section deter nines that the bicycle crankset is in the prescribed radial range upon determining a pedaling force of the bicycle crankset is in a prescribed force measurement range.

6. The bicycle drive apparatus as recited in claim 1, further comprising
a crank position sensor that detects a position of the bicycle crankset; and the output control section determines if the bicycle crankset is in the prescribed range based on a detection result of the crank position sensor.

7. The bicycle drive apparatus as recited in claim 1, wherein
the transmission is an internal transmission.

8. The bicycle drive apparatus as recited in claim 1, wherein
the transmission is an external transmission.

9. The bicycle drive apparatus as recited in claim 1, wherein
the drive assistance electric motor is configured to drive a bicycle chain.

10. The bicycle drive apparatus as recited in claim 1, wherein
the prescribed radial range is 20 to 40 degrees.

* * * * *